(12) United States Patent
Haslberger et al.

(10) Patent No.: US 8,500,094 B2
(45) Date of Patent: Aug. 6, 2013

(54) BATTERY REMOVAL APPARATUS FOR A VEHICLE, IN PARTICULAR AN ELECTRIC INDUSTRIAL TRUCK, AND A LOCKING DEVICE FOR SUCH A BATTERY REMOVAL APPARATUS

(75) Inventors: Johannes Haslberger, St. Wolfgang (DE); Christian Maier, Griesstätt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 342 days.

(21) Appl. No.: 12/884,494

(22) Filed: Sep. 17, 2010

(65) Prior Publication Data
US 2011/0068309 A1    Mar. 24, 2011

(30) Foreign Application Priority Data

Sep. 18, 2009  (DE) .......................... 10 2009 042 116
Oct. 5, 2009   (DE) .......................... 10 2009 045 340

(51) Int. Cl.
| B66F 3/24  | (2006.01) |
| B66F 5/00  | (2006.01) |
| B66F 3/12  | (2006.01) |
| B60R 16/04 | (2006.01) |
| B21D 39/03 | (2006.01) |

(52) U.S. Cl.
USPC ........... 254/2 R; 254/7 B; 254/7 R; 180/68.5; 29/428

(58) Field of Classification Search
USPC .............. 254/2 R, 134, 133 R, 120, 7 R, 7 B, 254/10 B; 180/68.5; 193/35 R; 29/428; 414/607, 345, 340; 187/237; 429/100, 97; 269/17
See application file for complete search history.

(56) References Cited

U.S. PATENT DOCUMENTS

| 6,619,643 B1 * | 9/2003 | Hayday ......................... 269/139 |
| 7,258,184 B2 * | 8/2007 | Shorney et al. ............... 180/68.5 |
| 2009/0288898 A1 * | 11/2009 | Boegelein et al. ........... 180/68.5 |

FOREIGN PATENT DOCUMENTS

| DE | 10 2004 052 067 A1 | 9/2005 |
| DE | 10 2006 060 325 A1 | 6/2008 |
| EP | 1 405 778 A1 | 4/2004 |
| EP | 2 011 761 A2 | 1/2009 |
| FR | 2 862 035 A1 | 5/2005 |
| JP | 2004-315179 A | 11/2004 |

\* cited by examiner

*Primary Examiner* — Monica Carter
*Assistant Examiner* — Seahee Yoon
(74) *Attorney, Agent, or Firm* — Rothwell, Figg, Ernst & Manbeck, P.C.

(57) ABSTRACT

A battery removal apparatus for a vehicle, comprising a mobile lifting device with vertically adjustable load-handling means, and a locking device mounted thereon for locking engagement of an exchangeable battery unit of a vehicle in its engagement member. A locking device for a battery removal apparatus wherein the locking device is a sub-assembly combined to form a one-piece module comprising, a base frame to be mounted on a load-handling means of a lifting device, said base frame comprising two ramp portions and two locking hooks, wherein the locking hooks are arranged side by side at a given lateral distance apart on the base frame, are pivotable about a common pivot axis between a locking position and a release position, and are coupled by a common pivot shaft.

14 Claims, 4 Drawing Sheets

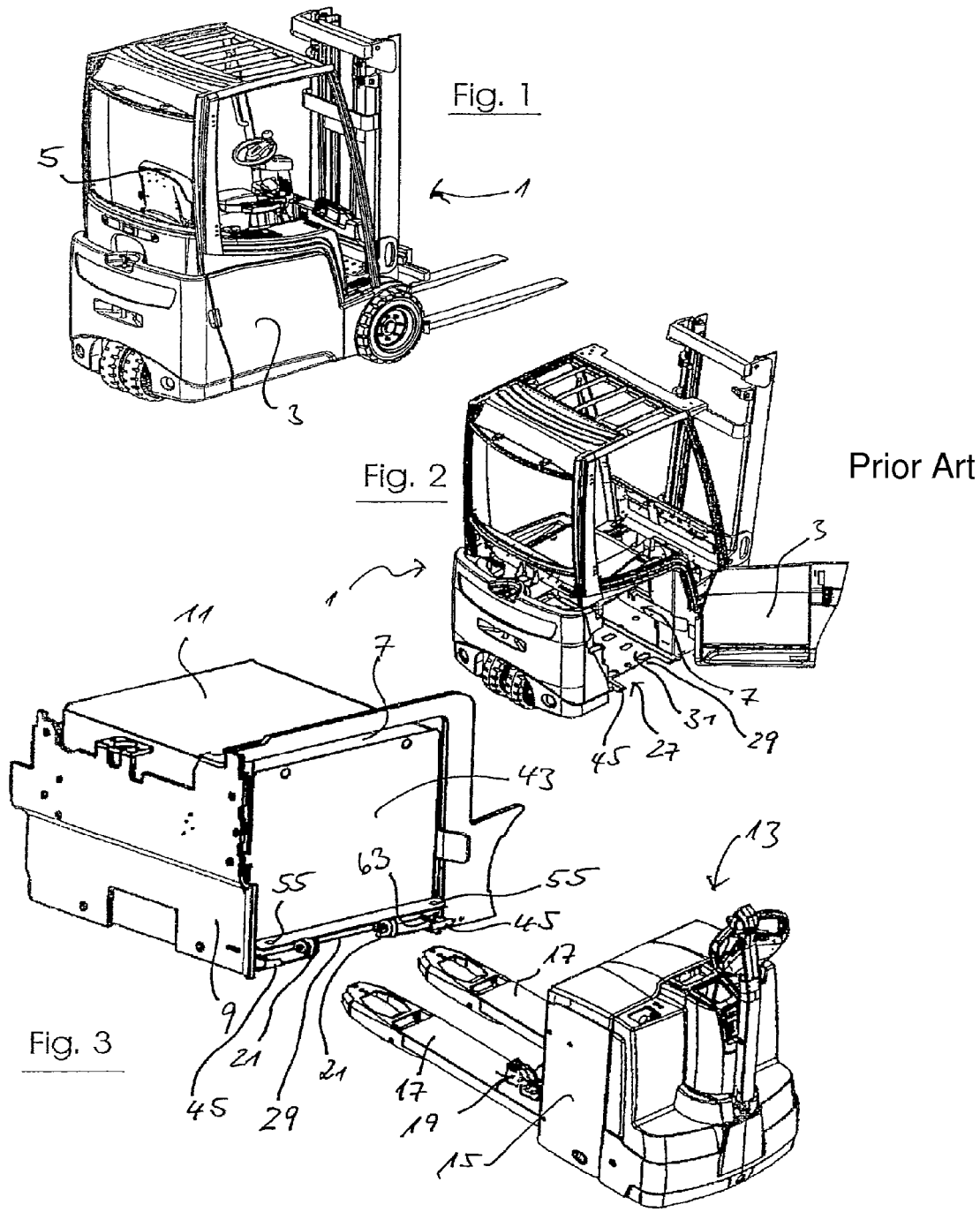

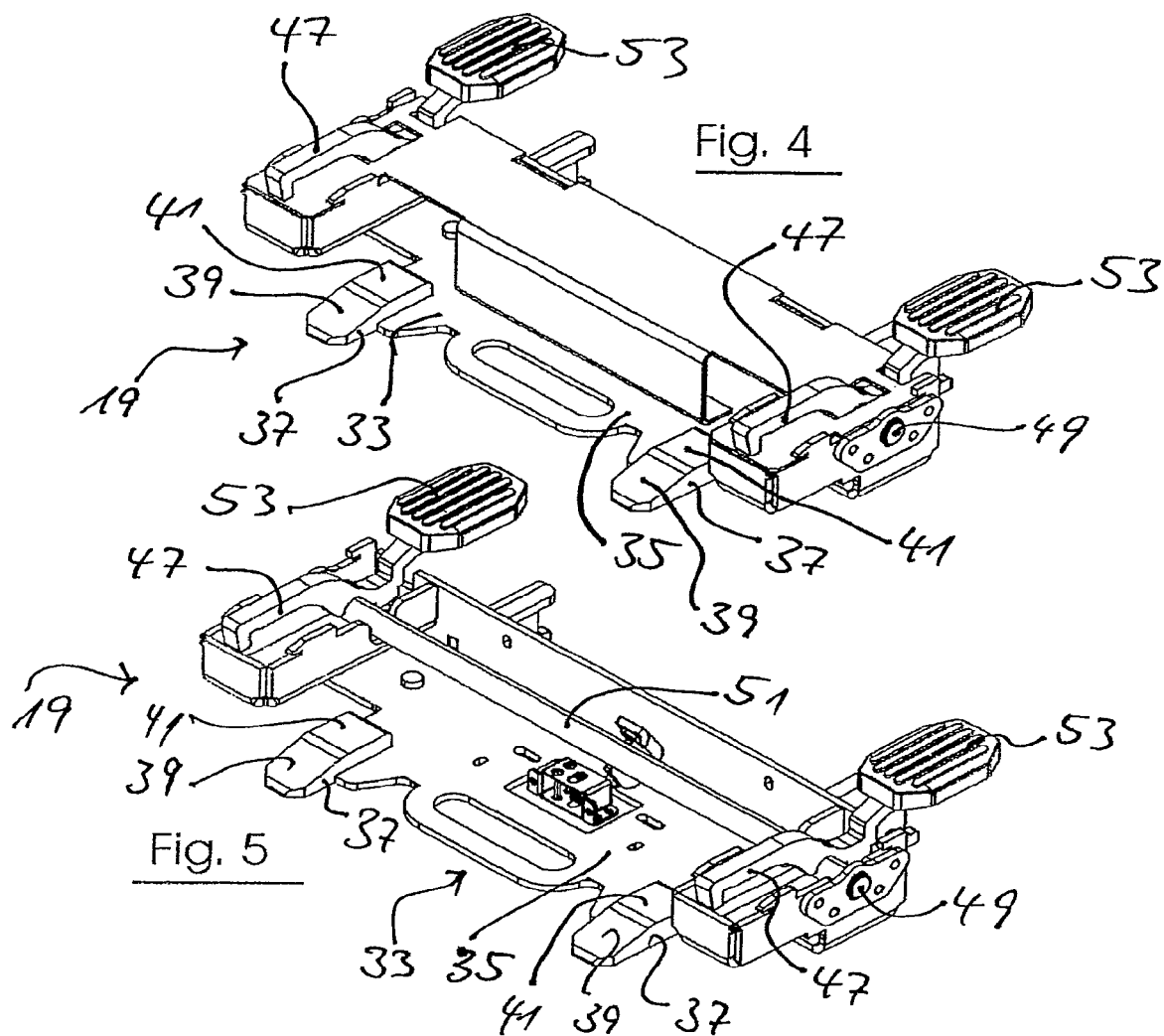
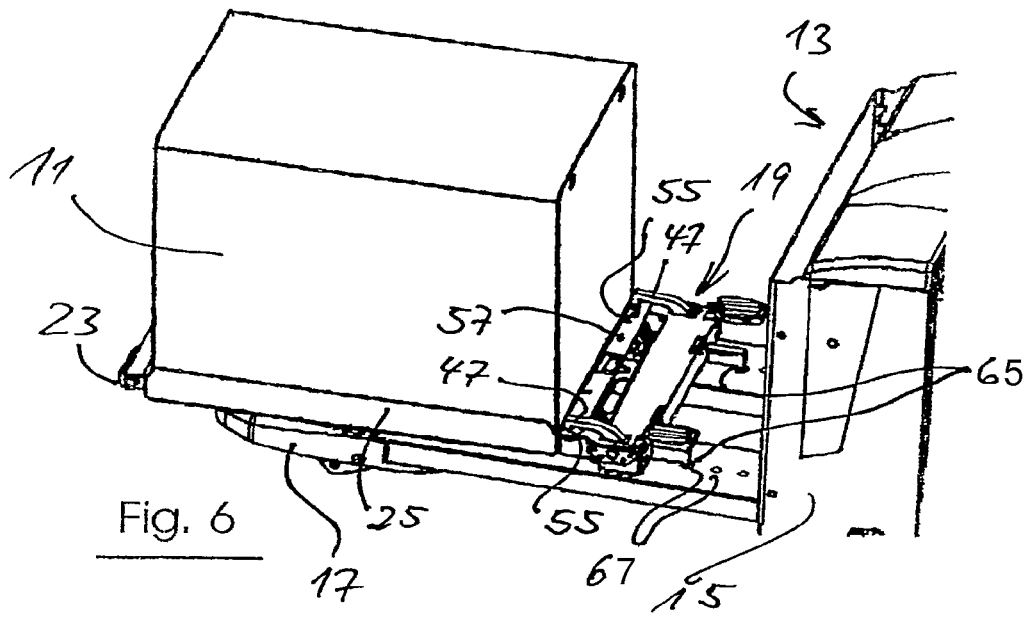

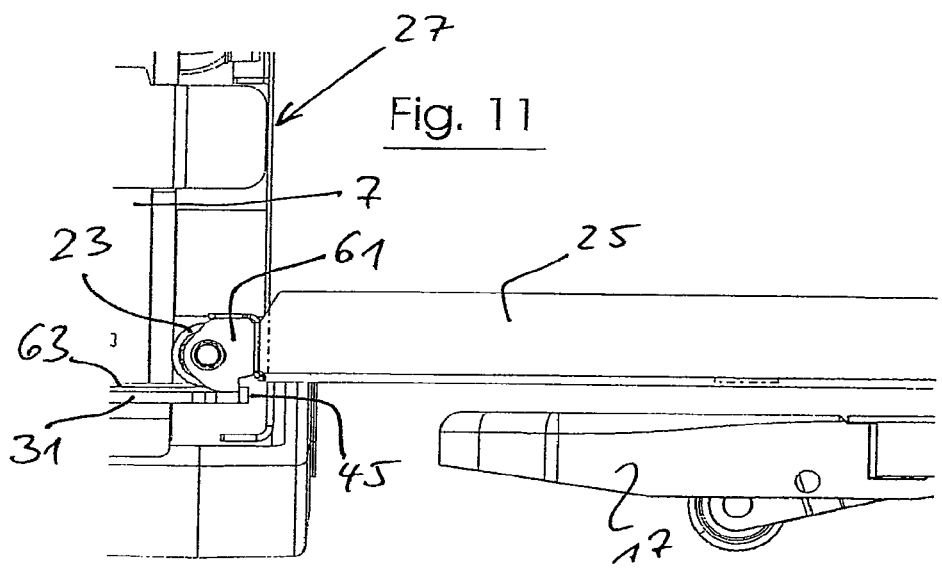
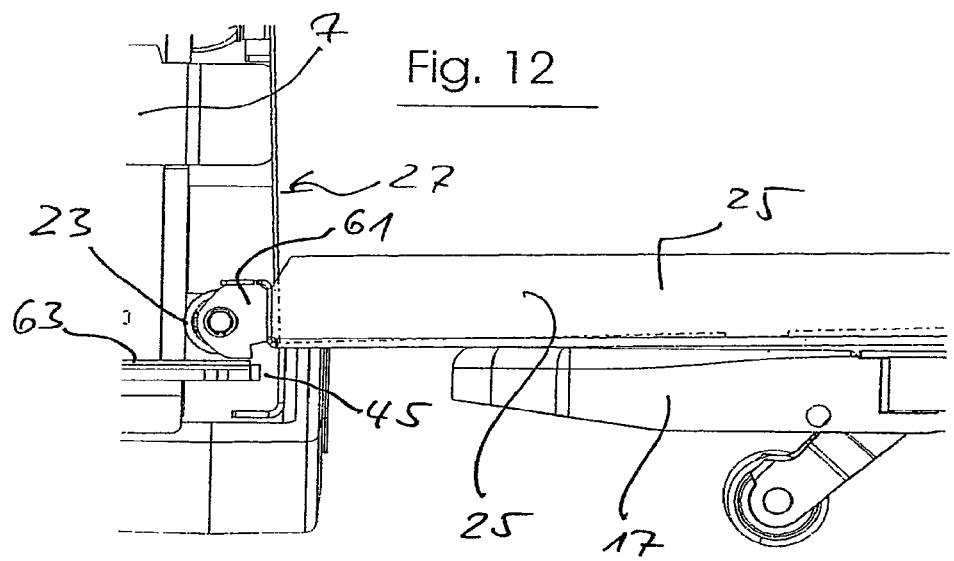

BATTERY REMOVAL APPARATUS FOR A VEHICLE, IN PARTICULAR AN ELECTRIC INDUSTRIAL TRUCK, AND A LOCKING DEVICE FOR SUCH A BATTERY REMOVAL APPARATUS

BACKGROUND OF THE INVENTION

The invention relates to a battery removal apparatus for a vehicle, in particular an electric industrial truck, which has a battery compartment having a lateral battery compartment opening and a battery compartment floor, with an exchange battery unit which is accommodated upright therein on the battery compartment floor and which is removed in a substantially horizontal direction from the battery compartment through the battery compartment opening, which exchange battery unit has in the vicinity of its side situated in the battery compartment nearest the battery compartment opening a lifting abutment, which is freely accessible from the battery compartment opening from below and which projects downwards, to be acted upon by the battery removal apparatus, wherein the battery removal apparatus comprises a mobile lifting device with vertically adjustable load-handling means.

A variety of different industrial trucks are known which are driven by electric motor and supplied with electric power from a battery unit, with a battery compartment containing the battery unit, which is accessible laterally for changing the battery.

Since a battery unit of the type under consideration here is of relatively great weight and relatively large volume, a battery removal apparatus is necessary for exchanging the battery unit. For cost reasons, this apparatus should as far as possible be a standard transport device, for example a tiller-steered fork-lift truck or possibly a forklift, with which the battery unit can be transported on fork arms. However, one problem here is that normally there is not enough space in the battery compartment on the underside of the battery unit to insert fork arms of such a transport device so as to accommodate the battery unit on the fork arms. Solutions are already known, in which the battery compartment floor is deeply recessed from the lateral access opening so that essentially only narrow floor side strips remain on which the battery unit rests. A battery unit of this type can then be simply engaged from below with fork arms of a fork-lift truck inserted under the industrial truck in alignment with such a recess and then raised by means of the fork arms and transported out of the battery compartment by withdrawing the fork-lift truck. Just as simply, with correspondingly reversed sequences of movement, a fork-lift truck can be used to insert a battery unit into the battery compartment with the battery compartment open. However, the relatively large recess in the battery compartment floor also entails a considerable weakening of the structural strength of the vehicle, which is indicated by distortion of the chassis during a battery unit exchange and when taking up heavy loads on load-carrying forks of the industrial truck and cannot be compensated for with simple means.

EP 2011761 A2 discloses an electric fork-lift truck with a laterally accessible battery compartment for battery exchange and a battery removal apparatus in the form of a fork-lift truck. In this known fork-lift truck, the battery compartment floor is not deeply recessed in the above-described disadvantageous manner. The battery unit, or a slide frame carrying the battery unit, has at its trailing or rear end when the battery unit is removed horizontally from the battery compartment, lower support rollers with which it is supported on the battery compartment floor in the battery compartment. At the end of the battery unit which, in the specified installation position of the battery unit in the battery compartment, is situated at the battery compartment opening, the battery unit or its slide frame has a lifting abutment in the form of a strip, which projects downwards beyond the free end of the battery compartment floor and which projects downwards beyond the underside of the battery compartment floor and extends in the longitudinal direction of the industrial truck. The battery unit or its slide frame is disposed directly on the battery compartment floor in the vicinity of its end situated at the battery compartment opening. To exchange the battery unit, for example a pedestrian-controlled fork-lift truck is pushed up to the battery compartment so that the load-carrying arms of the pedestrian-controlled fork-lift truck are guided under the battery compartment floor. Subsequently, the load-carrying arms are raised so that they act from below on the lifting abutment of the battery unit and during the continuation of the lifting movement they lift the battery unit at the end initially still situated at the battery compartment opening. Withdrawal of the pedestrian-controlled fork-lift truck then causes the battery unit, which rests with the lifting abutment on the load-carrying forks, to be removed from the battery compartment, whereupon it rolls on the battery compartment floor with its support rollers. As soon as the load-carrying forks have been withdrawn to such an extent that they no longer engage under the battery compartment floor, they can be raised further so as to take up completely the battery unit with its lifting frame, in which case securing abutments are overcome, which serve to prevent unintentional removal of the battery unit from the battery compartment during the lifting movement.

SUMMARY OF THE INVENTION

The basis of the present invention is a battery exchange concept of this type. It is based on the object of providing a battery removal apparatus which facilitates the exchange of a battery unit provided at the battery compartment opening side, which can be removed horizontally from an open battery compartment and which has a downwardly projecting lifting abutment which is freely accessible from the battery compartment opening and from below, wherein only minor adaptation measures are to be taken with respect to the battery unit, namely the provision of an engagement member, for instance in the form of a lug or an undercut.

According to the invention, this object is achieved by a battery removal apparatus in accordance with claim 1, wherein the battery removal apparatus is a mobile lifting device with vertically adjustable load-handling means and a locking device mounted thereon for locking engagement of the battery unit in its engagement member, and the locking device has a ramp portion, which is set back with respect to the front end of the load-handling means, with an inclined approach surface and an adjoining support surface for the lifting abutment of the exchange battery unit and a locking member which is complementary to the engagement member of the battery unit and which is arranged so as to come into locking engagement with the engagement member of the battery unit when the ramp portion of the locking device engages under the lifting abutment of the battery unit when the battery removal apparatus is brought up to the battery compartment so that the front end of the load-handling means extends under the battery compartment floor.

The mobile lifting device may be an industrial truck, for instance a pedestrian-controlled fork-lift truck or a forklift. Especially preferably, however, consideration may be given to a low-lift truck or high-lift truck driven by electric motor (15) with load-carrying forks as load-handling means.

To remove the battery unit from the battery compartment of the vehicle under consideration here, firstly a conventionally provided battery compartment door is opened so as to clear the battery compartment opening for access to the battery unit. Then the lifting device is brought up to the battery compartment so that the load-handling means extend with their ends to the front under the battery compartment floor and the inclined approach surface supported on the load-handling means acts on the lifting abutment. With further advance of the mobile lifting device, owing to the co-operation of the inclined approach surface and the lifting abutment, there takes place lifting of the battery unit on its side situated at the battery compartment opening until the lifting abutment comes into contact with a flat of the ramp portion following the inclined approach surface, which forms the support surface for the lifting abutment. During the underpassing procedure of the lifting abutment with the ramp portion, the locking member of the locking device comes into locking engagement with the complementary engagement member of the battery unit so that the battery unit is then coupled in a force-locking manner with the lifting device. Upon withdrawal of the mobile lifting device, the battery unit is necessarily removed from its battery compartment. As soon as the load-handling means of the lifting device have come out from under the battery compartment floor upon withdrawal, the battery unit can be fully accommodated thereon by raising the load-handling means. The battery unit can then transported with the mobile lifting device to a battery-charging station or the like. The insertion of a battery unit into the battery compartment of the vehicle in question here takes place in correspondingly inverse manner.

A particular advantage of the present invention lies in that during the battery removal operation the lifting of the battery unit on its side provided with the lifting abutment is effected in that the inclined approach surface of the ramp portion converts the forward movement of the mobile lifting device into a lifting movement of the battery unit in the battery compartment. Therefore, when using a fork-lift truck driven by electric motor as mobile lifting device, the drive unit of this mobile lifting device can be used to lift the battery unit in the battery compartment on the battery compartment opening side and to accommodate the lifting abutment on the support surface of the ramp portion. Therefore, the load-handling means need not be lifted separately for this operation. The resultant coupling of the battery unit to the locking device on the mobile lifting device can thus take place in a forward movement stage of the mobile lifting device, in which case the locking operation preferably takes place automatically between the locking member of the locking device and the engagement member of the battery unit.

As already disclosed in EP 2011761 A2, on its side remote from the battery compartment opening in the battery compartment the battery unit has support rollers, with which it can roll on the battery compartment floor when the battery unit is being removed or inserted.

The lifting abutment projects over the edge situated at the battery compartment opening to the extent that during forward movement of the lifting device with the load-handling means moving past just below the battery compartment floor it can be acted upon by the inclined approach surface. In this case it is not absolutely necessary for the lifting abutment to project downwards beyond the lower edge of the battery compartment floor.

Preferably, the lifting abutment of the battery unit is formed by at least one, preferably two, rollers which are arranged side by side at a given distance apart. In conformity therewith, it is proposed that the locking device has a base frame resting on the load-handling means, with two forward-projecting ramp portions disposed side by side and spaced at a given lateral distance apart and with wedge surfaces extending towards the front ends of the load-handling means and extending obliquely downwards and forming the inclined approach surface. The lateral distance apart of these ramp portions corresponds substantially to the lateral distance apart of the lifting abutment rollers of the battery unit so that when the lifting abutment rollers are acted upon by the ramp portions, as the lifting device is brought up to the battery compartment, the lifting abutment rollers are caused to rotate and this results in the ends of the battery unit provided with the lifting abutment rollers being accommodated with extremely low-friction on the mobile lifting device.

According to a preferred development of the invention, the locking device has a base frame resting on the load-handling means and two locking hooks as locking members, which are arranged side by side at a given lateral distance apart on the base frame, and which are pivotable about a common pivot axis between a locking position and a release position. These locking hooks are complementary locking members to two engagement portions, for instance engagement holes, which are or are to be provided on the battery unit and which have a corresponding lateral distance apart. Preferably, the locking hooks are lifting elements which under the action of gravity are displaced towards the locking position so that they can automatically come into locking engagement with the engagement elements on the battery unit. They can have inclined surfaces on their front outer hook ends, which when coming into contact with the battery unit during the approach movement cause the locking hooks to be automatically lifted towards the release position, after which they can drop into the locking position upon reaching the engagement members. Moreover, according to a preferred variant, the locking hooks are designed so that, in the specified locking position, with the occurrence of an essentially horizontal return force during withdrawal of the lifting device they are acted upon so as to remain in the locking position, i.e. they still tend to close. For this purpose, the hook inner surfaces are slightly inclined.

Preferably, the locking hooks are coupled by a common pivot shaft extending transversely to the load-handling means of the lifting device for the common pivoting movement about the axis of the pivot shaft.

To enable an operative to release, when necessary, the locking engagement between the locking hooks and the engagement members, the locking hooks are preferably coupled to a pedal-like foot-actuated lever which can be operated by the operative so as to shift the locking hooks into their unlocking position.

According to an especially preferred embodiment of the invention, the locking device is a sub-assembly combined to form a uniform module, which is preferably fastened in a releasably detachable manner on the load-carrying means of the mobile lifting device. Such a locking device can be rapidly combined, for example, with a conventional fork-lift truck or the like so as to form a battery removal apparatus according to the invention. Equally rapidly, the locking device can removed again from the lifting device so that the latter can be utilised in the usual way for stacking and unstacking operations.

Preferably, the locking device can be fastened by means of a plug-and-socket connection to the load-carrying means of the mobile lifting device, although alternatively a screw connection or clamping connection could also be considered.

The subject-matter of the invention is also a locking device for a battery removal apparatus according to the invention, which in a sub-assembly combined to form a one-piece module comprises:

a base frame to be mounted on the load-handling means of the mobile lifting device, with two ramp portions disposed side by side and spaced at a given lateral distance apart, which ramp portions have inclined approach surfaces for the lower lifting abutment of the battery unit forming wedge surfaces, and two locking hooks which are arranged side by side at a given lateral distance apart on the base frame, and which are pivotable about a common pivot axis between a locking position and a release position, wherein the locking hooks are coupled by a common pivot shaft for the common pivoting movement about the axis of the pivot shaft.

Preferably, the locking hooks are biased towards the locking position, for instance by gravity and/or spring force.

The locking hooks are preferably coupled to an actuating lever, in particular a pedal-like foot-actuated lever, which can be operated by an operative so as to shift the locking hooks into the unlocking position. Preferably, the locking device also has plug-and-socket connecting means for releasable connection to the load-handling means of the lifting device.

The vehicle with one or more battery units of the above-described type and the battery removal apparatus form an advantageous battery exchange system in accordance with the invention.

BRIEF DESCRIPTION OF THE SEVERAL VIEWS OF THE DRAWINGS

One example of an embodiment of the invention will be illustrated in more detail below with reference to the drawings.

FIG. 1 shows, in a perspective view, an electric industrial truck in the form of a fork-lift truck;

FIG. 2 shows, in a perspective view, essentially the chassis of the fork-lift truck in FIG. 1, with the battery compartment door open;

FIG. 3 shows the battery compartment with the other chassis parts omitted, with an exchange battery unit accommodated therein and with a battery removal apparatus according to the invention, in a perspective view;

FIG. 4 shows, in a perspective view, a locking device according to the invention for a battery removal apparatus of the invention;

FIG. 5 shows, in a perspective view, the locking device in FIG. 4 without cover plate;

FIG. 6 shows, in a perspective view, a partial view of a battery removal apparatus according to the invention with an exchange battery unit accommodated thereon;

FIG. 11 shows the detail from FIG. 10, which is denoted by the reference XI in FIG. 10, in an enlarged illustration;

FIG. 12 shows a detailed view corresponding to FIG. 11 of the components from FIG. 11 once the exchange battery unit is completely accommodated on the battery removal apparatus.

DETAILED DESCRIPTION OF THE INVENTION

Figure 7:
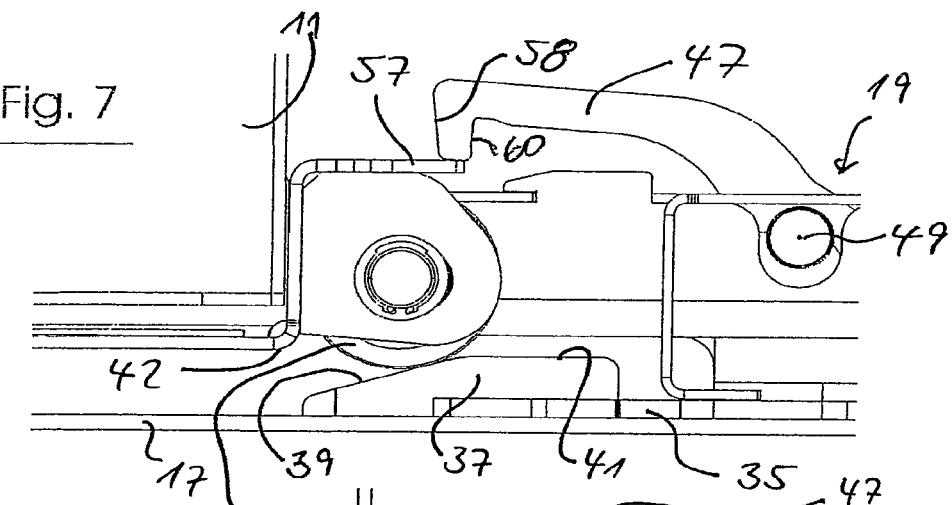
FIG. 7 shows, in a side view in section, an instantaneous illustration of a lifting abutment roller passing under the exchange battery unit situated in the battery compartment of the electric fork-lift truck by means of a ramp of the locking device.

In the electric fork-lift truck shown in FIG. 1, the reference numeral 3 denotes a lateral battery compartment door which closes a battery compartment 7 situated under the driver's seat 5.

In FIG. 2 the battery compartment door 3 is shown in the open position, wherein the interior of the empty battery compartment 7 is partly visible.

To simplify the view of an exchange battery unit 11 accommodated in the battery compartment 7, in FIG. 3 only the battery compartment frame 9 is shown with the exchange battery unit 11 accommodated in the battery compartment 7. FIG. 3 also shows a battery removal apparatus 13 according to the invention in alignment with the battery compartment 7 which is accessible laterally after opening the battery compartment door 3. The battery removal apparatus comprises a tiller-steered electric fork-lift truck 15 with two load-carrying forks 17 and a locking device 19 which is secured on the load-carrying forks 17 by means of a plug-and-socket connection.

The exchange battery unit 11 comprises a slide frame 25 provided with front lifting-abutment rollers 21 and rear support rollers 23. The front lifting-abutment rollers 21 project on the opening side 27 of the battery compartment 7 beyond the free edge 29 of the battery compartment floor 31 and, in particular, downwards. However, it is not absolutely necessary for the rollers to project downwards beyond the underside of the battery compartment floor when the exchange battery unit 11 is accommodated in the normal position in the battery compartment 7 shown in FIG. 3.

To remove the battery unit 11 from the battery compartment 7, the battery removal apparatus 13 is brought to the battery compartment 7 in the illustrated alignment corresponding to FIG. 3, wherein the load-carrying forks 17 are so adjusted in their height that during the advancing operation of the battery removal apparatus 13 they arrive under the battery compartment floor 31 and then merely have a small distance, for example 3-10 mm, from the underside of the battery compartment floor 31. Finally, during this forward movement of the battery removal apparatus 13 the locking device 19 comes into use, which will be explained in more detail below with reference to FIGS. 4 and 5.

The locking device 19 is a sub-assembly combined to form a one-piece module which comprises a base frame 33 with a bottom plate 35, which rests in the use position on the load-carrying forks 17 of the electric fork-lift truck 15, and two ramp portions 37 which are provided on the bottom plate 35 and each of which comprises a front inclined approach surface 39 for a lifting abutment roller 21 of the battery unit 11 and also a support surface 41 for the lifting abutment roller 21 adjoining the inclined approach surface 39.

With corresponding approach of the ramp portions 37 to the lifting abutment rollers 21 in the situation according to FIG. 3 during the continued advance of the battery removal apparatus 13, the inclined approach surfaces 39 of the ramp portions 37 finally encounter the lifting abutment rollers 21, in which case it is be noted in this respect that the lateral distance apart of the lifting abutment rollers 21 rotatable about a common pivot axis and the lateral distance apart of the ramp portions 37 of the locking device 19 are matched to one another. Therefore, the lifting abutment rollers 21 can roll on the inclined approach surfaces 39 of the ramp portions 37, whereupon the exchange battery unit 11 is raised at its front end 43 situated on the battery compartment opening side 27.

Figure 8:
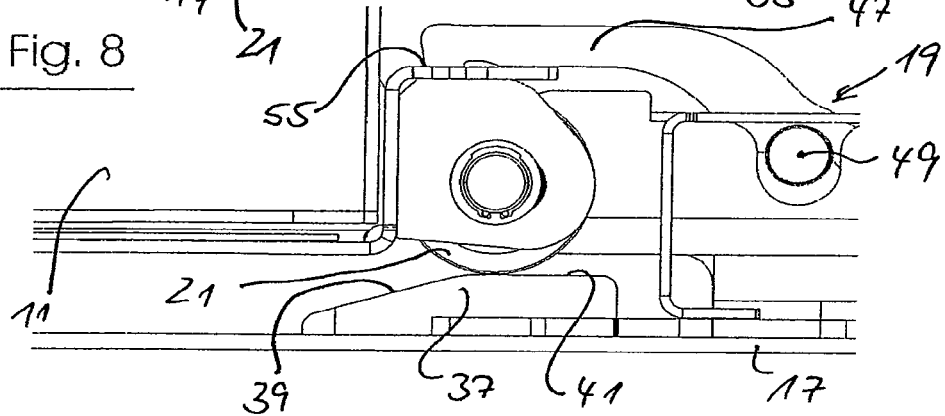
FIG. 8 shows, in a view corresponding to FIG. 7, an instantaneous illustration in which the lifting abutment roller rests on a support portion of the ramp and the battery unit is coupled to the locking device.

This procedure of raising the battery unit 11 on account of the rolling of the lifting abutment rollers 21 on the inclined approach surface 39 is shown in FIGS. 7 and 8 in two succeeding instantaneous illustrations, wherein in FIG. 8 the lifting abutment roller 21 has already reached the upper support surface 41 of the ramp portion 37. During this lifting movement, the battery unit 11 reaches with its front lower edge 41 beyond two safety abutments (45 in FIG. 3 and FIG. 11).

The locking device 19 has two locking hooks 47 which are pivotable about a common pivot axis 49 between a locking position according to FIGS. 4, 5, 6 and 8 and an release position according to FIG. 7. For this purpose, they are connected by a common pivot shaft 51 which is mounted rotatably on the base frame 33. The locking hooks 47 form with the pedals 53 double-sided levers with the pivot shaft 51 as lever pivot axis so that by stepping on one of the pedals 53 the locking hooks 47 can be raised into the release position shown in FIG. 7. The pivot shaft 51 is mounted very low on the base frame 33, wherein the locking hooks 47 are so formed and arranged that they are situated above the pivot shaft 51.

The locking hooks 47 serve to engage so as to lock into two engagement openings 55 in a front horizontal sheet-metal projection 57 of the slide frame 25 of the battery unit 11. This takes place automatically when, during the advance of the battery removal apparatus 13, the lifting abutment rollers 21 of the exchange battery unit 11 arrive in accordance with sequence of the FIGS. 7 and 8 from the inclined approach surface 39 to the support surface 41 of the ramp portion. In FIG. 7 shows a locking hook 47 in the previously adjusted release position, wherein under the action of gravity it bears on the projecting sheet-metal portion 57 until, finally, it can drop so as to lock into the engagement opening 55 according to FIG. 8. According to a variant (not shown) of the locking hook, its front end is set an angle so that upon impinging on the front edge of the horizontal sheet-metal overhang 57 of the slide frame 25 it is automatically forced into the release position shown in FIG. 7 and subsequently it arrives in the locking position according to FIG. 8 and engages into the engagement opening 55. The hooks are preferably also configured so that they are suitable for automatic release.

Figure 9:
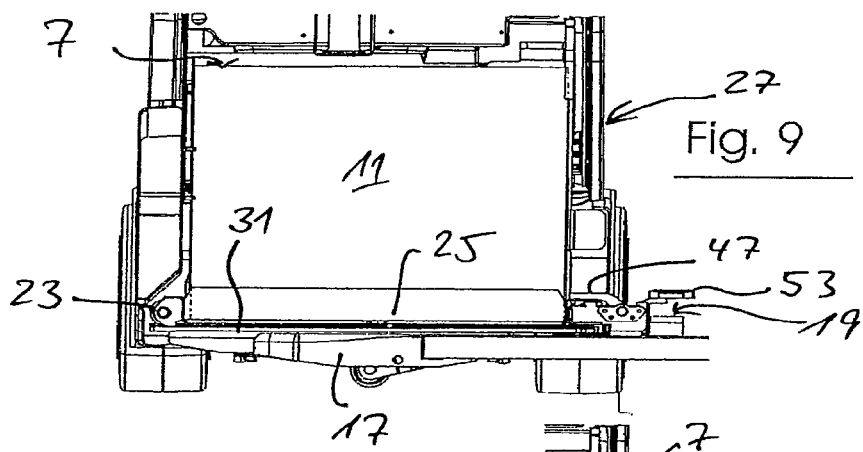
FIG. 9 shows, in an illustration with a vertical section through the battery compartment in a side view, the exchange battery unit according to FIG. 8 locked to the (only partly shown) battery removal apparatus in the position still fully accommodated in the battery compartment.

The exchange battery unit 11 is now coupled to its slide frame 25 by means of the locking device 19 to the battery removal apparatus 13; however, it is still completely accommodated in the battery compartment according to FIG. 9. Upon withdrawing the battery removal apparatus, finally the exchange battery unit 11 is removed from the battery compartment 7 until the load-carrying forks 17 of the battery removal apparatus 13 project under the battery compartment floor 31, as is shown in FIG. 10.

To achieve a self-locking effect of the hooks 47 in the locking position upon withdrawal of the battery unit 11 from the compartment 7, the inner surfaces 60 of the hooks are slightly beveled.

Figure 10:
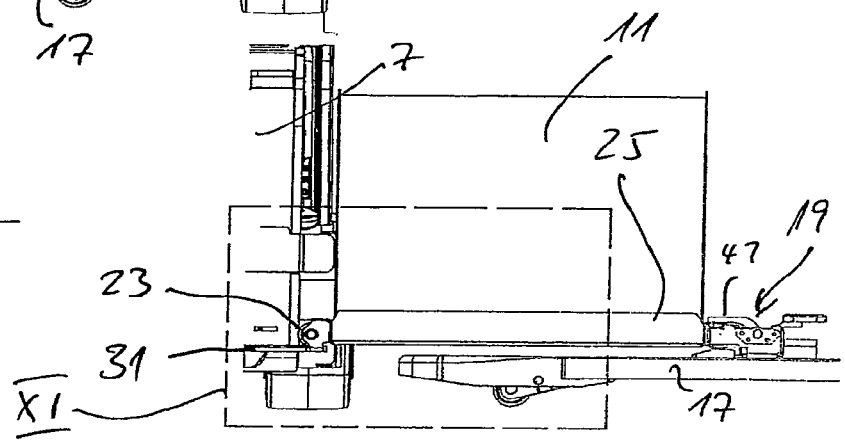
FIG. 10 shows, in a similar perspective to FIG. 9, the exchange battery unit almost completely removed from the battery compartment by the battery removal apparatus, but in which its following support rollers are still supported on the battery compartment floor of the electric fork-lift truck.

According to FIG. 10 and the enlarged detailed view thereof in FIG. 11, the battery unit 11 has been withdrawn from the battery compartment 7 to such an extent that the roller support 61 of the rear support rollers 23 of the battery unit 11 have encountered with their lower zones the abutments 45 of the battery compartment floor 31. Further withdrawal of the battery unit 11 from the battery compartment 7 is possible only after lifting the battery unit 11 over the abutments 45. This is effected by raising the load-carrying forks 17 of the electric fork-lift truck 15 so that they fully accommodate the battery unit 11, as is shown in the detailed view in FIG. 12. Finally, the battery unit 12 can be then transported on the battery removal apparatus 13 in the disposition shown in FIG. 6. FIG. 6 shows that the majority of the exchange battery unit 11, viewed in a longitudinal direction, is engaged from below by the load-carrying forks 17, in accordance with the horizontal distance between the front ends of the load-carrying forks 17 and the locking device 19. This distance should be greater, by as much as possible, than half the length of the battery unit 11, viewed in the withdrawal direction.

Therefore, an electric fork-lift truck 15 or a similar lifting device can be simply retrofitted with a battery removal apparatus according to the invention by arranging the locking device, preferably in the form of a module, in a corresponding manner on the load-carrying forks 17 and securing it thereto. For example, for securing purposes a plug-and-socket connection can be used, with pin plugs 65 provided on the locking device 19 and plug-in holes 67 provided in the load-carrying forks 17. For this purpose, the load-carrying forks 17 ca prepared with a grid of plug-in holes so that different spacings can be chosen between the front ends of the load-carrying forks 17 and the locking device 19 to be secured thereon.

It should be added that the battery compartment floor 31 of the lift truck 1 has guide rails 63 for the rear support rollers 23 of the slide frame of the exchange battery unit 11.

The industrial truck with the battery unit 11 and the battery removal apparatus 13 constitute a novel and advantageous battery exchange system.

The invention claimed is:

1. A battery removal apparatus for a vehicle, comprising a mobile lifting device with vertically adjustable load-handling means having a front end, and a locking device mounted thereon for locking engagement of an exchangeable battery unit of a vehicle in its engagement member, wherein the locking device comprises a ramp portion, which is set back with respect to the front end of the load-handling means, with an inclined approach surface and an adjoining support surface for a lifting abutment of the exchangeable battery unit, and a locking member which is complementary to the engagement member of the exchangeable battery unit and which is arranged so as to come into locking engagement with the engagement member of the exchangeable battery unit when the ramp portion of the locking device engages under the lifting abutment of the exchangeable battery unit when the battery removal apparatus is brought up to the battery compartment so that the front end of the load-handling means extends under the battery compartment floor.

2. The battery removal apparatus according to claim 1, wherein the mobile lifting device is a tiller-steered electric lift truck, wherein the tiller-steered electric lift truck is a fork-lift truck, with load-carrying forks as the load-handling means.

3. The battery removal apparatus according to claim 2, wherein the fork-lift truck has a drive unit, wherein the drive unit is driven by an electric motor.

4. The battery removal apparatus according to claim 1, wherein the locking device has a base frame resting on the load-handling means, with two ramp portions disposed side by side and spaced at a given lateral distance apart, and with wedge surfaces extending towards the front ends of the load-handling means and extending obliquely downwards and forming the inclined approach surface.

5. The battery removal apparatus according to claim 1, wherein the locking device has a base frame resting on the load-handling means and two locking hooks as the locking members, wherein the locking hooks are arranged side by side at a given lateral distance apart on the base frame, and are pivotable about a common pivot axis between a locking position and a release position.

6. The battery removal apparatus according to claim 5, wherein the locking hooks are coupled by a common pivot shaft extending transversely to the load-handling means for the common pivoting movement about the axis of the pivot shaft.

7. The battery removal apparatus according to claim 1, wherein the locking member or locking members are coupled to an actuating lever, wherein the actuating lever is a pedal-like foot-actuated lever, which can be operated by an operator so as to shift the locking member or locking members into their unlocking position.

8. The battery removal apparatus according to claim 1, wherein the locking device is a sub-assembly combined to form a uniform module.

9. The battery removal apparatus according to claim 8, wherein the locking device is fastened in a releasably detachable manner on the load-carrying means of the mobile lifting device.

10. The battery removal apparatus according to claim 9, wherein the locking device is fastened by means of a plug-and-socket connection to the load-handling means of the mobile lifting device.

11. A locking device for a battery removal apparatus, wherein the locking device is a sub-assembly combined to form a one-piece module comprising, a base frame to be mounted on a load-handling means of a lifting device, said base frame comprising two ramp portions disposed side by side and spaced at a given lateral distance apart, wherein the ramp portions have inclined approach surfaces for a lifting abutment of an exchangeable battery unit forming wedge surfaces, and two locking hooks, wherein the locking hooks are arranged side by side at a given lateral distance apart on the base frame, are pivotable about a common pivot axis between a locking position and a release position, and are coupled by a common pivot shaft for the common pivoting movement about the axis of the pivot shaft.

12. The locking device for a battery removal apparatus according to claim 11, wherein the locking hooks are biased towards the locking position.

13. The locking device for a battery removal apparatus according to claim 11, wherein the locking hooks are coupled to an actuating lever, wherein the actuating lever is a pedal-like foot-actuated lever, which can be operated by an operator so as to shift the locking hooks into the unlocking position.

14. The locking device for a battery removal apparatus according to claim 11, wherein the locking device has plug-and-socket connecting means for releasable connection to the load-handling means of the lifting device.

* * * * *